United States Patent [19]

Helversen

[11] 4,249,654
[45] Feb. 10, 1981

[54] HYDROGEN STORAGE APPARATUS

[76] Inventor: Frederick D. Helversen, 300 Sand Hill Cir., #206, Menlo Park, Calif. 94025

[21] Appl. No.: 78,777

[22] Filed: Sep. 25, 1979

[51] Int. Cl.³ .................. F17C 11/00; C01B 1/26; B65D 25/00; F16L 55/04
[52] U.S. Cl. .................. 206/0.7; 34/15; 62/48; 220/88 R; 423/248; 423/648 R
[58] Field of Search .................. 206/0.7; 220/88 R; 34/15; 62/48; 423/248, 648 R

[56] References Cited
U.S. PATENT DOCUMENTS

| 933,152 | 9/1909 | Avery | 206/0.7 |
|---|---|---|---|
| 3,134,491 | 1/1979 | Turillon et al. | 206/0.7 |
| 3,315,479 | 4/1967 | Wiswall, Jr. et al. | 34/15 |
| 3,508,414 | 4/1970 | Wiswall, Jr. et al. | 62/48 |
| 4,096,639 | 6/1978 | Sandrock | 34/15 |
| 4,134,490 | 1/1979 | Turillon et al. | 206/0.7 |
| 4,152,145 | 5/1979 | Sandrock | 34/15 |

Primary Examiner—William T. Dixson, Jr.
Attorney, Agent, or Firm—Stephen P. Fox

[57] ABSTRACT

A hydrogen storage container having at least one valved port is filled to about 75% of capacity with particles of low density material having a hydride forming metal coated on the surface of the particles by vapor or vacuum deposition. The density of the particle is on the order of 5% to 50% of the density of the metal coating thereon. Hydrogen gas is adsorbed into or released from the lattice structure of the hydride forming metal.

12 Claims, 9 Drawing Figures

U.S. Patent    Feb. 10, 1981    4,249,654
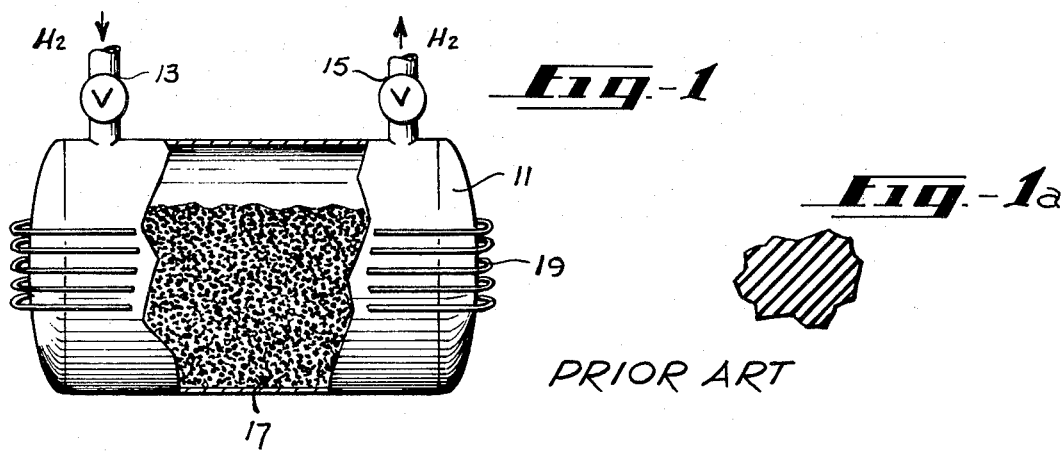
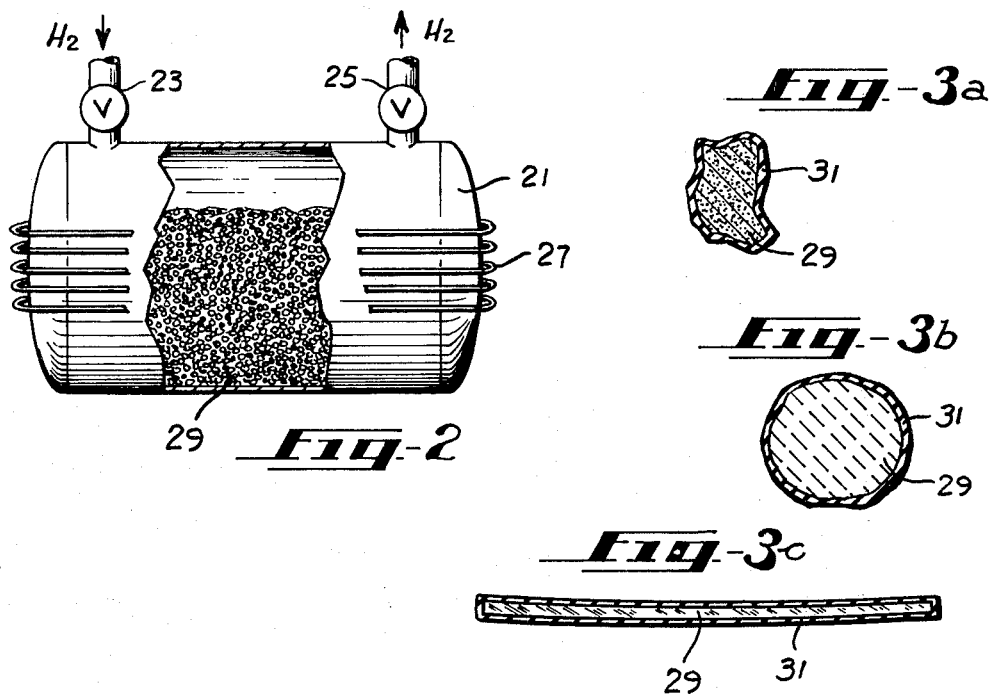
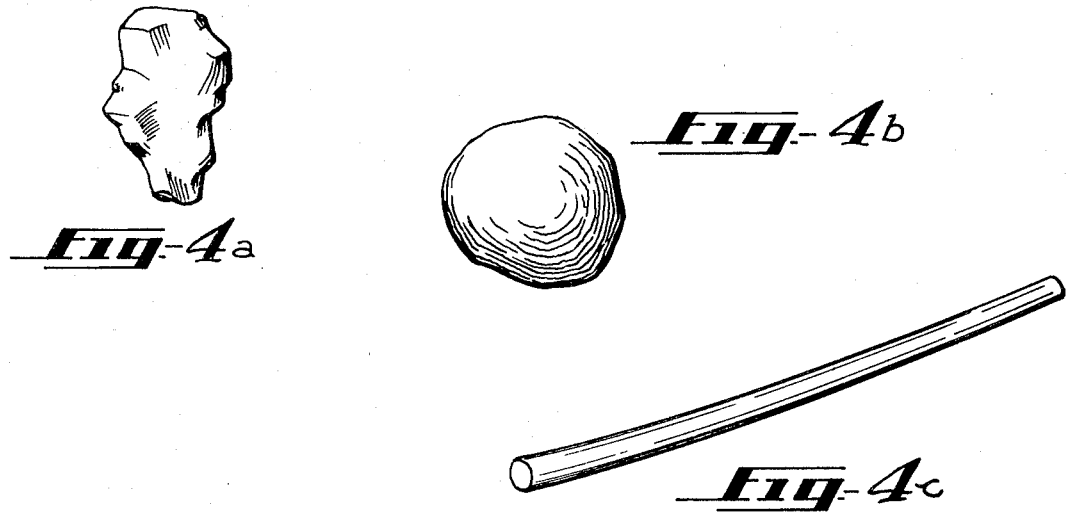

HYDROGEN STORAGE APPARATUS

BACKGROUND OF THE INVENTION

The present invention relates generally to the storage of hydrogen gas as a hydride of metal particles in a container.

Known hydrogen storage containers are filled with particles or chips of a hydride forming metal alloy having a molecular lattice structure which entraps hydrogen atoms. Hydrogen gas is fed into the container and is absorbed into the metal particles. Thereafter, upon application of heat to the container, hydrogen is released from the metal hydride and pressurized in the container. The container is provided with one or more valved ports to allow ingress and egress of the hydrogen. Such containers have found use as portable storage of hydrogen as a fuel for powering hydrogen engines on vehicles and the like.

Typically, the hydride forming metal particles in the container are dense and heavy, weighing on the order of 190 pounds per cubic foot. Such particles are effective in adsorbing and thus storing only about 2% hydrogen by weight. Therefore, a cubic foot of particles will store and release about 3.8 pounds of hydrogen. Such small storage capacity is unsatisfactory in hydrogen engine powered vehicles, for example. This is because the container weight required to provide suitable hydrogen fuel reserve is on the order of many hundreds of pounds.

SUMMARY OF THE INVENTION

The present invention provides a hydrogen storage apparatus which weighs substantially less than heretoforeknown hydrogen storage containers having the same hydrogen capacity.

In the illustrated embodiment of the invention, a hydrogen container is filled to about 75% of capacity with light weight particles which are coated with a hydride forming metal. The inner cores of the particles are comprised of rare earths, porous ceramics, fiberglass, or the like, having an uncompressed density on the order of 5% to 50% of the density of the hydride forming metal coating on the particle surface. The hydride forming metal may be iron titanium alloy, lanthanum nickel 5, misch metal-nickel 5, magnesium nickel or the like. The coating of metal on the particle is achieved by chemical, physical, or vacuum vapor deposition. The coating may be as little as a few molecules in thickness and can be varied.

By way of example, the present invention permits storage of 3.8 pounds of hydrogen in a cubic foot of metal coated particles weighing only 19 pounds. On a weight comparison basis, such storage capacity is a ten-fold improvement over known hydrides.

BRIEF DESCRIPTION OF THE DRAWINGS

FIG. 1 is a diagrammatic, partically cut-away view of a hydrogen storage container of the type heretofore known in the art.

FIG. 1(a) is a cross-sectional view of one of the particles of hydride forming metal in the container shown in FIG. 1.

FIG. 2 is a generalized diagrammatic partially cut-away view of one embodiment of the present invention.

FIGS. 3(a), (b) and (c) are enlarged cross-sectional views of particles within the container shown in FIG. 2.

FIGS. 4(a), (b) and (c) are perspective views of the particles shown in FIGS. 3(a), (b) and (c), respectively.

DESCRIPTION OF THE PREFERRED EMBODIMENTS

Referring to FIG. 1, there is shown a hydrogen storage tank 11 of the type known in the prior art. Tank 11 has a valved input port 13 and a valved output port 15. Partially filling tank 11 is a plurality of particles or chips 17 composed of a hydride forming metal. Surrounding the tank is a heating and cooling means illustrated diagrammatically by heating and cooling coils 19.

In operation, valved port 13 is opened, port 15 is closed, and hydrogen gas is fed into tank 11 under pressure slightly greater than atmospheric pressure, or more, depending on the speed of adsorbtion desired. Valved port 13 is then closed. At this time, heating coils 19 are not energized. The hydrogen gas in the tank is adsorbed into the metal particles and entrapped as a metal hydride in the molecular lattice structure of the particles. Hydrogen is stored in the tank until needed. When it is desired to release hydrogen from the tank, valved port 15 is opened and coils 19 are energized to apply heat to the tank. The metal particles, under influence of the applied heat, release the hydrogen as a gas which is emitted from port 15.

A typical hydride forming metal particle is shown in cross-section in FIG. 1(a). The particle may be as small as a grain of sand or as large as a marble, for example. In any event, the particle is solid metal. the metal is a compound or alloy of selected substances having a molecular lattice structure that entraps hydrogen molecules. Typically, such hydride forming metals have a density of 280 lbs./ft.$^3$. The particles in a loosely packed state weigh on the order of 190 pounds per cubic foot and can store about 2% hydrogen by weight. Thus one cubic foot of particles weighing 190 pounds will store and release about 3.8 pounds of hydrogen. It can be seen that such a tank is an inefficient storage device from the standpoint of weight.

FIG. 2 illustrates a storage apparatus featuring the improvements of the present invention. There is provided a hydrogen container 21 including valved inlet and outlet ports 23, 25 and heating means 27. The container 21 is partially filled with particles 29, which in loosely packed state occupy from about 70% to 80% of the volume of the container. Unlike heretoforeknown configurations, particles 29 are specially constructed in accordance with the principles of the present invention. In particular, a typical one of the particles 29 is comprised of a light weight carrier substance which is coated with a thin layer of hydride forming metal. Hydrogen gas is admitted into the container 21 and is adsorbed into the lattice structure of the metal coating on the surface of each particle. The process of adsorption and release of hydrogen is the same as described above.

FIGS. 3(a), (b) and (c) illustrate in enlarged cross-section three exemplary types of particles 29 in container 21. The same three types are shown in corresponding perspective views in FIGS. 4(a), (b) and (c). Referring first to FIGS. 3(a) and 4(a), the particle has an irregular surface area and is comprised of a carrier substance 29 upon which is deposited a thin layer of metal 31. The density of the carrier substance 29 is preferably in the range of about 5% to 50% of the density of the metal coating thereon. The carrier substance may be, for example, diatomaceous earth or other rare earth, powdered porous ceramic, or glass fibers, having a density of 15 to 80 lbs./ft.$^3$. The hydride forming metal 31 coated on the particle has a much higher density on the order of 280 lbs./ft.$^3$. The metal coating may be, for example, iron titanium alloy, lanthanum nickel 5, misch metal-nickel 5, or magnesium nickel.

FIGS. 3(*b*) and 4(*b*) illustrate in cross-section and perspective view a particle having a more spherical shape than that described above. Still another form of particle is shown in FIGS. 3(*c*) and 4(*c*), wherein an elongated fiber carrier made of glass, for example, is coated with the hydride forming metal layer. In the cases of FIGS. 3(*a*), 4(*a*) and 3(*b*) and 4(*b*) the particles may be as small as a grain of sand or as large as a marble. Preferably, the particle size ranges from 1 to 10 millimeters in the largest cross-section. The rod-like fiber of FIGS. 3(*c*), 4(*c*) is preferably on the order of 1 millimeter in circular cross-section and 1 to 20 millimeters in length.

A thin layer of hydride forming metal is produced on the carrier substance by vapor or vacuum deposition according to known processes. More particularly, chemical vapor deposition may be used. There is provided a stream of inert gas containing an organometallic composition of the metal to be deposited. Carrier particles are heated to a temperature higher than the organometallic gas stream and placed into the stream. The gas composition decomposes upon impact with a carrier particle. The organic portion of the gas volatilizes, leaving the metal which is deposited on the particle as a thin coating. The hydride forming metallic coating need be only a few molecules thick on each particle, since only the particle surface is active to adsorb and release hydrogen. Preferably, the coating ranges in thickness from about 0.01 to 1 millimeter. The thickness of the coating, and thus the depth of the molecular lattice structure, can be selected for the particular metal which is vapor deposited, in order to provide for maximum hydrogen storage capacity.

The carrier particles may also be coated with a thin layer of metal by an r.f. sputtering process. Accordingly to this process, carrier particles are cascaded through a plasma field, wherein the plasma comprises the metal desired to be deposited.

In an uncompressed state, the metalized lightweight particles can weigh, for example, only about 10% as much as solid metal particles or chips occupying the same volume. Thus, a cubic foot of the loosely packed metal coated particles weighs about 19 pounds, compared with 190 pounds per cubic foot of loosely packed solid metal particles commonly used in heretofore-known hydrogen storage tanks. The cubic foot of lightweight particles stores about 3.8 pounds of hydrogen so the efficiency of storage based on weight is about 20%, verses 2% for solid metal particles. This represents a ten-fold increase in storage efficiency over the prior art.

I claim:
1. Apparatus for storing hydrogen comprising:
    a container having at least one valved port;
    a plurality of particles disposed within said container, said particles including:
    a carrier substance; and
    a hydride forming metal vapor deposited on the surface of said carrier substance to form a coating; said metal coating being capable of adsorbing and releasing hydrogen gas.
2. The apparatus of claim 1, wherein the uncompressed density of said carrier substance is less than the density of said hydride forming metal.
3. The apparatus of claim 1, wherein said particles occupy from 70% to 80% of the internal volume of said container.
4. The apparatus of claim 1, wherein said carrier substance is fiber glass.
5. The apparatus of claim 1, wherein said carrier substance is a material selected from the group consisting of diatomaceous earth, porous ceramics, and fiberglass.
6. The apparatus of claim 1, wherein said hydride forming metal vapor deposited on the surface of said carrier substance is a metal selected from the group consisting of iron titanium alloy, lanthanum nickel 5, misch metal-nickel 5 and magnesium nickel.
7. The apparatus of claim 6, wherein the metal coated particles disposed in said container range in size from about 1 to about 15 millimeters in largest cross-sectional dimension.
8. The apparatus of claim 6, wherein said hydride forming metal is vacuum deposited on the surface of said carrier substance to a thickness of between about 0.01 and about 1 millimeter.
9. Apparatus for storing hydrogen comprising:
    a container having at least one valved port;
    a plurality of carrier particles disposed within said container, said carrier particles having a predetermined low density less than 190 lbs./ft.$^3$; and
    a hydride forming metal vapor deposited as a coating onto the surfaces of said carrier particles for adsorbing and releasing hydrogen gas in said container.
10. The apparatus of claim 9, wherein the density of the carrier particles coated with said hydride forming metal is in the range of about 5% to about 50% of the density of said metal.
11. The apparatus of claim 10, wherein said carrier particles are selected from the group consisting of rare earths, fiberglass and porous ceramics.
12. The apparatus of claim 10, wherein said metal coated particles occupy from about 70% to about 80% of the internal volume of said container.

* * * * *